Patented June 6, 1944

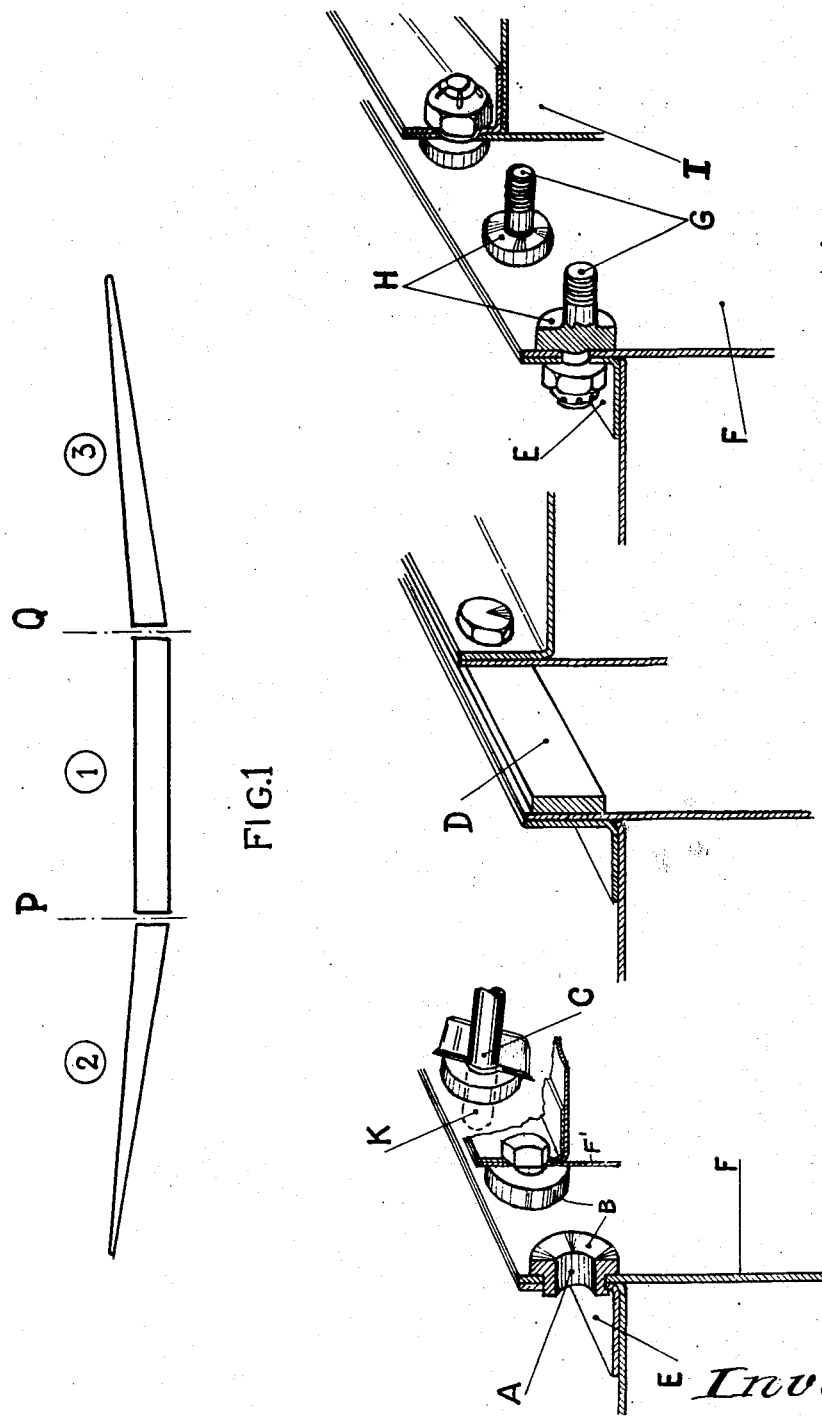

2,350,827

UNITED STATES PATENT OFFICE 2,350,827

METHOD OF ASSEMBLY OF TANKS AND THE LIKE

Raymond Saulnier, Paris, France; vested in the Alien Property Custodian

Application February 13, 1942, Serial No. 430,823
In France May 15, 1940

1 Claim. (Cl. 189—36)

The present invention relates to the assembly of box-like structures and in particular to airplane wings made of three portions at least the central portion of which acts both as girder and as fuel tank. When assembling box-like structures of this kind, constituted by welded or riveted metal sheets, it is found that the faces along which the assembly is to take place are no longer flat after the deformations due to their manufacture. These faces therefore necessitate a planing operation which is very difficult and sometimes impossible to perform directly.

The object of the present invention is to permit of assembling such box-like structures in a perfect manner whatever be the deformations undergone by the metal sheets during the manufacture.

For this purpose, according to an essential feature of the present invention, I make use of intermediate pieces interposed between the surfaces along which the box-like structures are to be assembled together, these intermediate pieces being made sufficiently thick so that they can be rectified according to the needs.

Other features of the present invention will result from the following detailed description of some specific embodiments thereof.

Preferred embodiments of the present invention will be hereinafter described with reference to the accompanying drawing given merely by way of example and in which:

Fig. 1 is a diagrammatical view showing three box-like structures to be assembled together;

Fig. 2 is a perspective view of an embodiment of the invention;

Figs. 3 and 4 are views similar to Fig. 2 and corresponding to two other embodiments.

In Fig. 1, reference character 1 designates the central box-like structure of a wing made of three portions and the lateral elements of which, to wit 2 and 3, also consist of welded or riveted box-like structures, the central point 1 constituting for instance both the main girder of the aircraft and the fuel tank thereof.

In this figure, the surfaces along which the different portions are assembled together are shown at P and Q.

Fig. 2 shows a preferred embodiment of the invention, according to which rings A are set along the periphery of each face of assembly. These rings A are made of substantial thickness so that they can be rectified in order to make account for the deformations which may have occurred in faces P or Q. The purpose of the openings in the rings is to receive bolts for securing the two structures together. A showing of such bolt in place would not be substantially different from that shown at the right of Fig. 4. The rings A will then have their inner flanges B of varying width depending upon the varying distance apart of the plates F and F'.

This embodiment of the invention involves several advantages:

Rings A, while permitting to obviate the effects of the deformations of the metal sheets, according to the principle of the invention, further serve to the assembly of the portions E and F of the box-like structures.

The setting of these rings may be carried out very easily without involving any danger of leakage.

Furthermore, the rectification of the edge of each ring can be effected manually by means of a tool such as C, provided with a guiding tail K, which engages in the ring.

Fig. 3 shows another embodiment of the invention in which metal strips such as D are interposed between the faces to be assembled, these strips being secured to the box-like structures in any suitable manner and being made of a thickness sufficient for permitting, by rectification thereof, to compensate for the deformations which may have occurred in the metal sheets.

In the embodiment of Fig. 4, I provide bolts such as G, which contribute to the assembly of the two elements E and F of one of the tanks, these bolts being characterized by the fact that they carry annular flanges H of different thicknesses.

According to the invention, these thicknesses are chosen in such manner that the face I of the box-like structure to be assembled with the face F of the other box-like structure occupies the desired position with respect thereto. The distances determined by the choice of the thicknesses of the annular flanges H will compensate for any deformations as may have occurred during the manufacture of the tanks.

While I have, in the above description, disclosed what I deem to be practical and efficient embodiments of the present invention, it should be well understood that I do not wish to be limited thereto, as there might be changes made in the arrangement, disposition and form of the parts, without departing from the principle of the invention, as comprehended within the scope of the appended claim.

What I claim is:

Joining means for two box-like metal structures, each having a wall bent outwardly and in facial contact with an adjacent wall, means for joining said walls and said box-like structures comprising, rings each extending through the outwardly bent portion of a wall and the adjacent wall of one of the structures, said rings having flanges between which said outwardly bent portion and adjacent wall are clamped, bolts extending through said rings and through the outwardly bent portion and adjacent wall of the other structure and serving to clamp said structures together, the ring flanges between the two structures being of different thicknesses so as to fully occupy the space between the structures at the bolts.

RAYMOND SAULNIER.